US008792386B2

(12) United States Patent
Guo et al.

(10) Patent No.: US 8,792,386 B2
(45) Date of Patent: Jul. 29, 2014

(54) METHOD FOR TRANSMITTING ATTRIBUTES BASED ON FIBER CHANNEL NETWORK AND SWITCH SYSTEM

(75) Inventors: Yingjun Guo, Zhejiang (CN); Feiyu Li, Zhejiang (CN); Feng Zhang, Zhejiang (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 100 days.

(21) Appl. No.: 13/387,336

(22) PCT Filed: Sep. 3, 2010

(86) PCT No.: PCT/CN2010/076616
§ 371 (c)(1),
(2), (4) Date: Jan. 26, 2012

(87) PCT Pub. No.: WO2011/026439
PCT Pub. Date: Mar. 10, 2011

(65) Prior Publication Data
US 2012/0147784 A1    Jun. 14, 2012

(30) Foreign Application Priority Data
Sep. 4, 2009  (CN) .......................... 2009 1 0092324

(51) Int. Cl.
*H04L 12/28* (2006.01)
(52) U.S. Cl.
USPC .......................................................... 370/254
(58) Field of Classification Search
USPC ............................................ 370/254; 398/45
See application file for complete search history.

(56) References Cited

U.S. PATENT DOCUMENTS

| 5,825,772 A * | 10/1998 | Dobbins et al. ................ 370/396 |
| 2005/0080912 A1* | 4/2005 | Finn ............................... 709/230 |

(Continued)

FOREIGN PATENT DOCUMENTS

| CN | 1647051 A | 7/2005 |
| CN | 1653847 A | 8/2005 |

(Continued)

OTHER PUBLICATIONS

Allied Telesis™ (x900 Series Switch AlliedWare™ Operating System Software Reference for Versions 2.9.1 & 3.2.1), 2005-2007, pp. i, ii, and xi; 9-1 through 9-27.*

(Continued)

*Primary Examiner* — Andrew Chriss
*Assistant Examiner* — Jose Perez

(57) ABSTRACT

An attribute propagation method and a switch system based on a fiber channel network are disclosed. According to the present invention, after an attribute is registered on one of its ports, each switch can automatically use its port on the other side to propagate this attribute, and a next adjacent switch can register this attribute on its port on the same side, so that ports on one side of all switches can have this attribute registered automatically. Hereafter, after the attribute is registered its port on the other side, each switch can automatically use its port on said one side that has been registered to propagate this attribute reversely and a next adjacent can register this attribute on its port on the other side, so that ports on the other side of all switches can automatically have this attribute registered. In this way, there is no need to manually configure each port. Instead, the attribute can be registered automatically on ports on both sides of all switches, thus improving the configuration efficiency for port attributes. Furthermore, the present invention can enable propagation of any attribute, thus making the present invention have a high popularity.

16 Claims, 5 Drawing Sheets

(56) References Cited

U.S. PATENT DOCUMENTS

| | | |
|---|---|---|
| 2005/0238353 A1 | 10/2005 | McGlaughlin et al. |
| 2008/0316942 A1* | 12/2008 | Desai et al. ............ 370/254 |
| 2010/0226281 A1* | 9/2010 | Ghosh et al. ............ 370/254 |

FOREIGN PATENT DOCUMENTS

| | | |
|---|---|---|
| CN | 1992729 A | 7/2007 |
| CN | 101645896 A | 2/2010 |
| WO | WO 2010007467 A1 * | 1/2010 |

OTHER PUBLICATIONS

Jeffree et al. (IEEE Standard for Local and metropolitan area networks—Virtual Bridged Local Area Networks Amendment 7: Multiple Registration Protocol) Jun. 22, 2007, pp. 23-28.*

International Search Report for PCT/CN2010/076616 Dec. 9, 2010.

* cited by examiner

METHOD FOR TRANSMITTING ATTRIBUTES BASED ON FIBER CHANNEL NETWORK AND SWITCH SYSTEM

CLAIM FOR PRIORITY

The present application is a national stage filing under 35 U.S.C 371 of PCT application number PCT/CN2010/076616, having an international filing date of Sep. 3, 2010, which claims priority to China Patent Application No. 200910092324.1 filed Sep. 4, 2009, the disclosures of which are incorporated by reference in their entireties.

TECHNICAL FIELD

The present invention relates to the technique of attribute configuration of switches, in particular to an attribute propagation method based on fiber channel (FC) networks, and a switch system based on FC networks that enables attribute propagation.

BACKGROUND OF THE INVENTION

In the existing switch systems based on FC networks, in order to enable communication between different network elements, the network administrator has to manually configure the corresponding attribute for each of the ports of all the switches between these network elements. However, once the network topology changes, the administrator again will have to adaptively adjust the attributes of the corresponding switch ports manually.

For example, in the case of dividing an FC network into different virtual storage area networks (VSAN), communication can take place only between a server and a physical magnetic disk belonging to the same VSAN, and in order to realize the communication between the server and the physical magnetic disk belonging to this VSAN, the network administrator has to manually configure attributes for ports on the server side and ports on the physical magnetic disk side of all switches between said server and said physical magnetic disk, namely, making them all join the corresponding VSAN. If there are N (N being a positive integer greater than or equal to 1) interconnecting switches between the server and the physical magnetic disk, the network administrator has to perform manual configuration 2N times. Of course, the configurable attributes may also include different zones in which each of the ports joins, and the situation thereof is similar to that of VSAN, so they will not be listed specifically herein.

Therefore, the existing attribute configuration can only be performed by the administrator manually, which is merely a static way of configuration, so the efficiency for port attribute configuration is low, and manual operation tends to cause mis-configuration.

SUMMARY OF INVENTION

In view of this, the present invention provides an attribute propagation method based on an FC network, and a switch system based on an FC network, which can improve the efficiency for port attribute configuration.

The attribute propagation method based on an FC network provided by the present invention is applied to interconnecting switches between a first network element and a second network element. For each attribute, the initial states of all ports of all switches are set to be an empty state in which said attribute has not been registered and does not need to be propagated, and said attribute propagation method comprises, for each attribute, the following steps:

after a port of a switch on the first network element side that is in an empty state is configured to be in a first state indicating that said attribute has been registered and needs to be propagated, the switch configuring a port thereof on the second network element side that is in an empty state to be in a second state indicating that said attribute has not been registered but needs to be propagated, and sending towards the direction of the second network element, by means of said port on the second network element side, a first registration message informing the opposite end to register said attribute and indicating that the present end has not registered said attribute;

after the port of the switch on the second network element side that is in the second state is configured to be in the first state, the switch sending towards the direction of the first network element, by means of its port on the first network element side that has been configured into the first state, a second registration message informing the opposite end to register said attribute and indicating that the present end has registered said attribute.

When the switch is adjacent to the first network element, the switch configures its port on the first network element side that is in the empty state into the first state according to the second registration message sent from the first network element towards the direction of the second network element or by manual configuration;

when the switch is not adjacent to the first network element, the switch configures its port on the first network element side that is in the empty state into the first state according to the first registration message sent from its adjacent switch on the first network element side towards the direction of the second network element;

when the switch is adjacent to the second network element, the switch configures its port on the second network element side that is in the second state into the first state according to the second registration message reversely sent from the second network element towards the direction of the first network element;

when the switch is not adjacent to the second network element, the switch configures its port on the second network element side that is in the second state into the first state according to the second registration message sent from its adjacent switch on the second network element side towards the direction of the first network element.

Said attribute propagation method comprises, for each attribute, the following steps:

after a port of a switch on the first network element side is configured back to the empty state, the switch sending towards the direction of the second network element, by means of its port on the second network element side, a first deregistration message informing the opposite end to deregister said attribute and indicating that the present end has not deregistered said attribute;

after a port of the switch on the second network element side is configured back to the empty state, the switch sending towards the direction of the first network element, by means of its port on the first network element side that has already been configured back to the empty state, a second deregistration message informing the opposite end to deregister said attribute and indicating that the present end has deregistered said attribute.

When the switch is adjacent to the first network element, the switch configures its port on the first network element side back into the empty state according to the second deregistration message sent from the first network element towards the direction of the second network element or by manual configuration;

when the switch is not adjacent to the first network element, the switch configures its port on the first network element side back into the empty state according to the first deregistration message sent from its adjacent switch on the first network element side towards the direction of the second network element;

when the switch is adjacent to the second network element, the switch configures its port on the second network element side back into the empty state according to the second deregistration message reversely sent from the second network element towards the direction of the first network element;

when the switch is not adjacent to the second network element, the switch configures its port on the second network element side back into the empty state according to the second deregistration message sent from its adjacent switch on the second network element side towards the direction of the first network element.

The port of each switch on the first network element side is provided with a first Join timer and a first Leave timer, and the port of each switch on the second network element side is provided with a second Join timer and a second Leave timer;

each time when its port on the second network element side sends the first registration message or the second registration message, each switch triggers the second Join timer to start timing and re-sends the first registration message or the second registration message by means of the port on the second network element side when the timing of the second Join timer expires; each time when its port on the first network element side receives the first registration message or the second registration message, each switch clears the first Leave timer to restart timing and configures its port on the first network element side back to the empty state when the timing of the first Leave timer expires;

each time when its port on the first network element side sends the second registration message, each switch triggers the first Join timer to start timing, and re-sends the second registration message by means of the port on the first network element side when the timing of the first Join timer expires; each time when its port on the second network element side receives the second registration message, each switch clears the second Leave timer to restart timing and configures its port on the second network element side back to the empty state when the timing of the second Leave timer expires.

The port of each switch on the first network element side is provided with a first list of attributes to be propagated for recording all attributes to be propagated by the port on the first network element side and the attributes to be deregistered; the port of each switch on the first network element side is also provided with a first Hold timer for starting timing when the state of the port on the first network element side changes, and for triggering the switch to send, by means of the port on the first network element side, the second registration message and/or second deregistration message corresponding to each of the attributes recorded in the first list of attributes to be propagated when the timing expires;

the port of each switch on the second network element side is provided with a second list of attributes to be propagated for recording all attributes to be propagated by the port on the second network element side and the attributes to be deregistered; the port of each switch on the second network element side is also provided with a second Hold timer for starting timing when the state of the port on the second network element side changes, and for triggering the switch to send, by means of the port on the second network element side, the first registration message and/or the second registration message and/or the first deregistration message and/or the second deregistration message corresponding to each of the attributes recorded in the second list of attributes to be propagated when the timing expires.

The first registration message, the second registration message, the first deregistration message, and the second deregistration message are all messages of the Switch Fiber Interactive Link Service SW_ILS protocol.

In the message load field of said SW_ILS protocol messages, the SW_ILS protocol commands in the 0th~3th bytes are set to be a value representing the attribute propagation, and starting from the 4th byte of the message load field, the attribute type, the number of bytes occupied by each type of attributes, the number of each type of attributes, and the attribute item of each type are carried;

wherein, each attribute item includes the event type corresponding to said attribute item as well as the attribute value, and the value of the event type is used for identifying the first registration message or the second registration message, or the first deregistration message or the second deregistration message.

Said attribute is the Virtual Storage Area Network VSAN or ZONE which the ports join.

The present invention provides a switch system based on an FC network. Said switch system is connected between a first network element and a second network element, and comprises a number of switches. For each attribute:

after a port of each switch on the first network element side that is in an empty state is configured to be in a first state indicating that said attribute has been registered and needs to be propagated, the switch configures a port thereof on the second network element side that is in the empty state to be in a second state indicating that said attribute has not been registered but needs to be propagated, and send towards the direction of the second network element, by means of said port on the second network element side, a first registration message informing the opposite end to register said attribute and indicating that the present end has not registered said attribute;

after a port of each switch on the second network element side that is in the second state is configured to be in the first state, the switch sends towards the direction of the first network element, by means of its port on the first network element side that has been configured into the first state, a second registration message informing the opposite end to register said attribute and indicating that the present end has registered said attribute.

The switch adjacent to the first network element further configures its port on the first network element side that is in the empty state into the first state according to the second registration message sent from the first network element towards the direction of the second network element or by manual configuration;

the switch that is not adjacent to the first network element further configures its port on the first network element side that is in the empty state into the first state according to the first registration message sent from its adjacent switch on the first network element side towards the direction of the second network element;

the switch adjacent to the second network element, further configures its port on the second network element side that is in the second state into the first state according to the second registration message reversely sent from the second network element towards the direction of the first network element;

the switch that is not adjacent to the second network element further configures its port on the second network element side that is in the second state into the first state according to the second registration message sent from its adjacent switch on the second network element side towards the direction of the first network element.

After a port of each switch on the first network element side is configured back to the empty state, the switch further sends towards the direction of the second network element, by means of its port on the second network element side, a first deregistration message informing the opposite end to deregister said attribute and indicating that the present end has not deregistered said attribute;

after a port of each switch on the second network element side is configured back to the empty state, the switch further sends towards the direction of the first network element, by means of its port on the first network element side that has already been configured back to the empty state, a second deregistration message informing the opposite end to deregister said attribute and indicating that the present end has deregistered said attribute.

The switch adjacent to the first network element configures its port on the first network element side back into the empty state according to the second deregistration message sent from the first network element towards the direction of the second network element or by manual configuration;

the switch that is not adjacent to the first network element configures its port on the first network element side back into the empty state according to the first deregistration message sent from its adjacent switch on the first network element side towards the direction of the second network element;

the switch adjacent to the second network element configures its port on the second network element side back into the empty state according to the second deregistration message reversely sent from the second network element towards the direction of the first network element;

the switch that is not adjacent to the second network element configures its port on the second network element side back into the empty state according to the second deregistration message sent from its adjacent switch on the second network element side towards the direction of the first network element.

The port of each switch on the first network element side is further provided with a first Join timer and a first Leave timer, and the port of each switch on the second network element side is further provided with a second Join timer and a second Leave timer, wherein, the first Join timer is used for starting timing each time when the port on the second network element side of the switch to which it belongs sends the first registration message or the second registration message, and triggering the switch to which it belongs to re-send the first registration message or the second registration message by means of the port on the second network element side when the timing expires;

the first Leave timer is used for clearing and restarting timing each time when the port on the first network element side of the switch to which it belongs receives the first registration message or the second registration message, and triggering the switch to which it belongs to configure the port on the first network element side back to the empty state when the timing expires;

the second Join timer is used for starting timing each time when the port on the first network element side of the switch to which it belongs sends the second registration message, and triggering the switch to which it belongs to re-send the second registration message by means of the port on the first network element side when the timing expires;

the second Leave timer is used for clearing and restarting timing each time when the port on the second network element side of the switch to which it belongs receives the first registration message, and triggering the switch to which it belongs to configure the port on the second network element side back to the empty state when the timing expires.

The port of each switch on the first network element side is further provided with a first list of attributes to be propagated for recording all attributes to be propagated by the port on the first network element side and the attributes to be deregistered;

the port of each switch on the first network element side is also further provided with a first Hold timer for starting timing when the state of the port on the first network element side changes, and for triggering the switch to send, by means of the port on the first network element side, the second registration message and/or second deregistration message corresponding to each of the attributes recorded in the first list of attributes to be propagated when the timing expires;

the port of each switch on the second network element side is further provided with a second list of attributes to be propagated for recording all attributes to be propagated by the port on the second network element side and the attributes to be deregistered;

the port of each switch on the second network element side is also further provided with a second Hold timer for starting timing when the state of the port on the second network element side changes, and for triggering the switch to send, by means of the port on the second network element side, the first registration message and/or the second registration message and/or the first deregistration message and/or the second deregistration message corresponding to each of the attributes recorded in the second list of attributes to be propagated when the timing expires.

The first registration message, the second registration message, the first deregistration message, and the second deregistration message are all messages of the Switch Fiber Interactive Link Service SW_ILS protocol.

In the message load field of said SW_ILS protocol messages, the SW_ILS protocol command in the 0th~3th bytes is set to be a value representing attribute propagation, and starting from the 4th byte of the message load field, the attribute type, the number of bytes occupied by each type of attributes, the number of each type of attributes, and the attribute item of each type are carried;

wherein, each attribute item includes the event type corresponding to said attribute item as well as the attribute value, and the value of the event type is used for identifying the first registration message or the second registration message, or the first deregistration message or the second deregistration message.

Said attribute is the Virtual Storage Area Network VSAN or ZONE which the ports join.

It can be seen from the above technical solutions that in the present invention, after each of the switches has registered the attribute on its port on the first network element side, said attribute can be propagated automatically using the port on the second network element side, so that the next adjacent switch can also register said attribute on its port on the first network element side, and continue to automatically propagate said attribute using the port on the second network element side, until the attribute is propagated to the second network element. In this way, said attribute is automatically registered on the ports on the first network element side of all switches between the first network element and second network element. Then, after each of the switches has registered the attribute on the port on the second network element side, said attribute can be reversely propagated automatically using the port on the first network element side, so that the next adjacent switch can also register said attribute on its port on the second network element side, and continue to automatically propagate said attribute reversely using the port on the first network element side, until the attribute is propagated back to the first network element. In this way, said attribute is automatically registered on the ports on the second network element side of all switches between the first network element and second network element. As a result, it is no longer necessary to manually configure each port, that is to say, said attribute can be automatically registered on the ports on the first network element side and the ports on the second network element side of all switches between the first network element and the second network element, thereby increasing the port attribute configuration efficiency and avoiding an error in configuration. Moreover, propagation of any attribute can be realized by means of the present invention, thus making the invention have higher popularity.

Alternatively, the propagation of attributes usually starts from the edge switch adjacent to the first network element. The edge switch can register an attribute for its port on the first network element side according to the registration message sent by the first network element, or the registration can be performed manually, but even if the edge switch has the attribute registered manually, other switches not adjacent to the first network element can also automatically realize attribute registration on the port on the first network element side; while the edge switch on the other side adjacent to the second network element can directly realize attribute registration on the port on the second network element side according to the registration message returned from the second network element.

In addition, with respect to deregistering of port attribute, it can be automatically realized in the present invention through interaction among switches, thereby further increasing port attribute configuration efficiency.

Further, considering that it is necessary to maintain the registered attributes of the ports of all switches, the port of each switch that has been registered may repetitively send the corresponding registration message at regular intervals; if a port on any side of any switch does not receive the repetitively sent registration message within a certain period of time, it means that the link might have failed, and the attribute that has been registered on the port on said side of said switch will be deregistered, so as to avoid the case where the port attribute cannot be deregistered owing to the link failure, thereby improving reliability in port attribute configuration.

Further, considering that various attributes might be configured on the ports of the same switch, and they need to be propagated or deregistered, in order to reduce the link oscillation caused by sending corresponding messages respectively for each of the attributes among switches, the present invention can provide a list for each port of each switch, and send messages regularly on a list basis, thus reducing the number of times of message transfer between switches.

Preferably, the present invention can realize various registration messages and various deregistration messages through modifying the message format in the existing FC network, thus the solution of the present invention can be easily implemented and is easily compatible with the FC network.

DETAILED DESCRIPTION

Figure 1A:
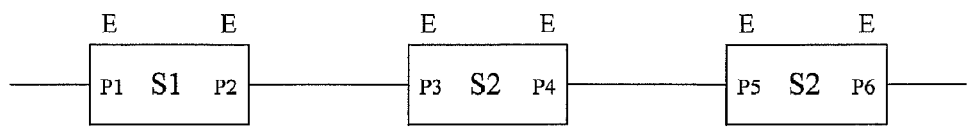
FIG. 1a to FIG. 1g are schematic diagrams of an attribute propagation process according to an embodiment of the present invention.

In order to better explain the objects, technical solutions and advantages of the present invention, the present invention is described in detail with reference to the drawings and by means of illustrative embodiments.

In embodiments of the present invention, in order to enable normal communication between a first network element and a second network element of any type through a number of interconnected switches, among all these switches, a corresponding attribute can be first registered on a port on the first network element side of an edge switch which is adjacent to the first network element, and then a port on the second network element side of this edge switch can automatically propagate this attribute towards the direction of the second network element, so that all the other switches between this edge switch and the second network element can automatically register this attribute on their ports on the first network element side and automatically use their ports on the second network element side to continue to propagate this attribute towards the direction of the second network element. In this way, a corresponding attribute can be registered on all the ports on the first network element side of all the switches between the first and second network elements.

After that, the above described corresponding attribute can be registered on a port on the second network element side of another edge switch on the other side which is adjacent to the second network element and then the port on the first network element side of the edge switch on the other side can automatically propagate this attribute towards the direction of the first network element reversely, so that all the other switches between the edge switch on the other side and the first network element can automatically register this corresponding attribute on their ports on the second network element side, and automatically use their ports on the first network element side on which this attribute has been registered to continue to propagate this attribute towards the direction of the first network element reversely. In this way, because all switches between the first network element and the second network element have registered the corresponding attribute on their ports on the first network element side, after the reverse propagation, all the switches between the first network element and the second network element can also register this corresponding attribute on their ports on the second network element side, so as to enable normal communication between the first network element and the second network element through all of these switches.

Wherein, propagation of an attribute usually starts from an edge switch which is adjacent to the first network element. This edge switch can register an attribute on its port on the first network element side according to the attribute propagated by the first network element, and it can also perform attribute registration manually (wherein manual registration of an attribute can be implemented in any existing manner). However, it needs to be pointed out that, even if the edge switch registers an attribute manually, other switches which are not adjacent to the first network element can also automatically realize attribute registration on a port on the first network element side according to the propagated attribute, while an edge switch on the other side which is adjacent to the second network element can realize attribute registration on their ports on the second network element side directly according to the attribute reversely propagated by the second network element.

Apparently, the embodiments can further achieve automatic deregistration of an attribute by propagating a notification for deregistering some attribute among switches, in a manner similar to that of registering an attribute on a port.

Specifically, in order to identify whether a port has been registered with any attribute and whether it needs to propagate this attribute, an embodiment sets the following states for a port:

Empty (E) state, indicating that this attribute has not been registered on the port and does not need to be propagated;

Static (S) state, indicating that this attribute has been registered manually on the port and needs to be propagated;

JoinIn (JI) state, indicating that this attribute has been registered automatically on the port and needs to be propagated;

JoinEmpty (JE) state, indicating that this attribute has not been registered on the port but needs to be propagated.

Wherein, the state S and the state JI are simply used to differentiate the different manners in which a corresponding attribute is registered on a port, but in effect, both of them can indicate that the attributed has been registered on the port and needs to be propagated. Moreover, whether the attribute "needs" or "does not need" to be propagated as indicated by these states, does not refer to whether the port itself in this state needs to propagate this attribute or not, instead it refers to whether other ports on the other side of the present machine need to propagate this attribute or not.

In order to enable propagation of any attribute between ports (including registering an attribute and deregistering an attribute), an embodiment provide the following messages:

JI message, for notifying the opposite end to register the attribute and indicating that the present end has registered the attribute;

JE message, for notifying the opposite end to register the attribute and indicating that the present end does not register the attribute;

LeaveIn (LI) message, for notifying the opposite end to deregister the attribute and indicating that the present end has not deregistered the attribute;

LeaveEmpty (LE) message, for notifying the opposite end to deregister the attribute and indicating that the present end has deregistered the attribute.

Assuming that there are three switches S1, S2 and S3, wherein S1 is an edge switch that is adjacent to the first network element and S3 is another edge switch that is adjacent to the second network element.

With reference to FIG. 1a, the states of port P1 of S1 on the first network element side, port P2 of S1 on the second network element side, port P3 of S2 on the first network element side, port P4 of S2 on the second network element side, port P5 of S3 on the first network element side and port P6 of S3 on the second network element side are all in E state.

Figure 1B:
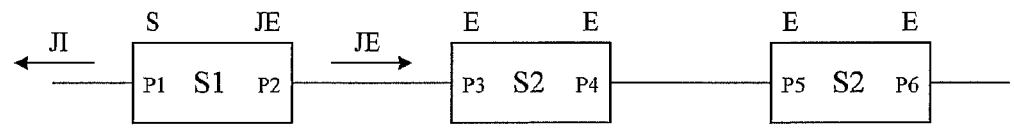

With reference to FIG. 1b, the port P1 of S1 on the first network element side is configured manually to be S state. Then the port P1 sends a JI message towards the direction of the first network element, which can configure its port that receives this JI message to be JI state, and port P2 on the second network element side can be automatically configured to be JE state and send a JE message towards the direction of the second network element.

Figure 1C:
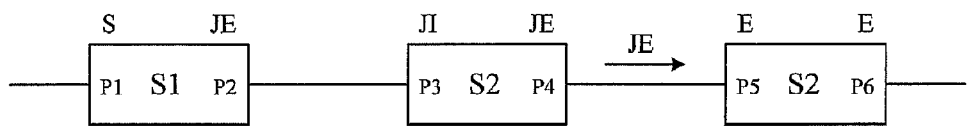

With reference to FIG. 1c, the port P3 of S2 on the first network element side is configured to be JI state according to the received JE message and the port P4 on the second network element side can be automatically configured to be JE state and continue to send a JE message towards the direction of the second network element.

Figure 1D:
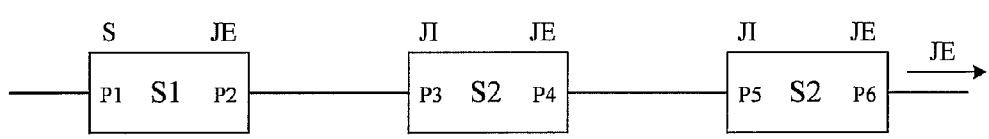

With reference to FIG. 1d, the port P5 of S3 on the first network element side is configured to be JI state according to the received JE message and the port P6 on the second network element side can be automatically configured to be JE state and continue to send a JE message towards the direction of the second network element. After that, the second network element can configure its port that receives the JE message to be JI state and transmit a JI message to S3 reversely.

Figure 1E:
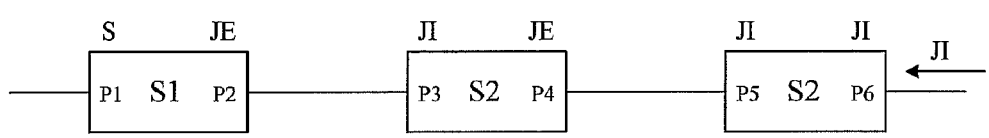

With reference to FIG. 1e, the port P6 of S3 on the second network element side is configured to be JI state according to the JI message transmitted reversely by the second network element and the port P5 on the first network element side which is in the JI state can automatically send a JI message towards the direction of the first network element.

Figure 1F:
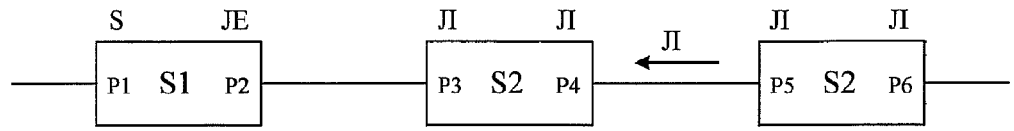

With reference to FIG. 1f, the port P4 of S2 on the second network element side is configured to be JI state according to the JI message transmitted reversely by S3 and the port P3 on the first network element side which is in the JI state can automatically send a JI message towards the direction of the first network element.

Figure 1G:
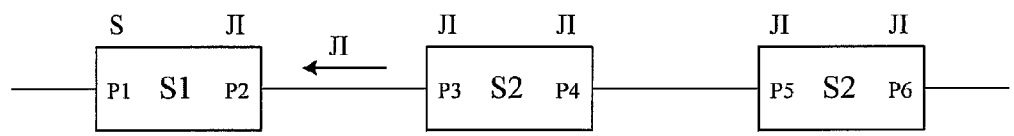

With reference to FIG. 1g, the port P2 of S1 on the second network element side is configured to be JI state according to the JI message transmitted reversely by S2 and because the port P1 on the first network element side which is in the S state has already propagated this attribute, no further processing will be performed.

Figure 2A:
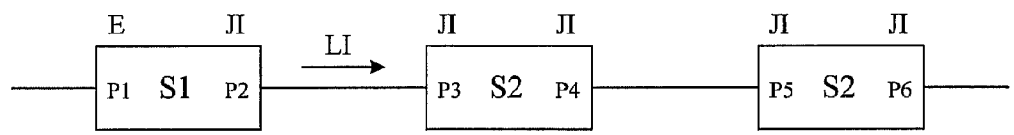
FIG. 2a to FIG. 2f are schematic diagrams of another attribute propagation process according to an embodiment of the present invention.

After processing as shown in FIG. 1a to FIG. 1g:

With reference to FIG. 2a, the port P1 of S1 on the first network element side is configured back to be E state manually. Then the port P1 sends an LE message towards the direction of the first network element. The first network element will configure its port that receives this LE message back to be E state and the port P2 on the second network element side which is in the JI state can automatically send an LI message towards the direction of the second network element.

Figure 2B:
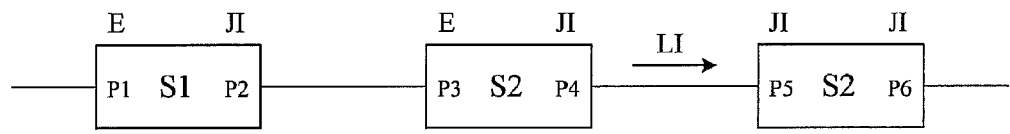

With reference to FIG. 2b, the port P3 of S2 on the first network element side is configured back to be E state according to the received LE message and the port P4 on the second network element side which is in the JI state can automatically send an LI message towards the direction of the second network element.

Figure 2C:
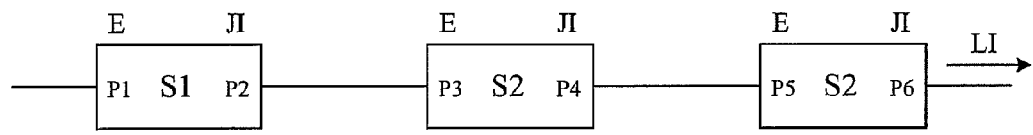

With reference to FIG. 2c, the port P5 of S3 on the first network element side is configured back to be E state according to the received LE message and the port P6 on the second network element side which is in the JI state can automatically send an LI message towards the direction of the second network element, and the second network element can configure its port that receives the LE message back to be E state.

Figure 2D:
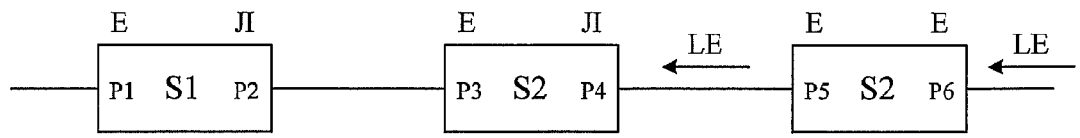

With reference to FIG. 2d, the port P6 of S3 on the second network element side is configured back to be E state according to the LE message transmitted reversely by the second network element and the port P5 on the first network element side which is in the E state can automatically send an LE message towards the direction of the first network element.

Figure 2E:
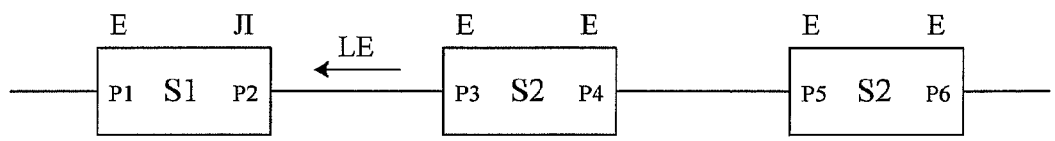

With reference to FIG. 2e, the port P4 of S2 on the second network element side is configured back to be E state according to the LE message transmitted reversely by S3 and the port P3 on the first network element side which is in the E state can automatically send an LE message towards the direction of the first network element.

Figure 2F:
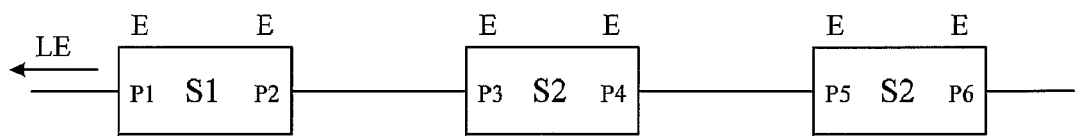

With reference to FIG. 2f, the port P2 of S1 on the second network element side is configured back to be E state according to the LE message transmitted reversely by S2 and the port P1 on the first network element side which is in the E state can automatically send an LE message towards the direction of the first network element and the first network element configures its port that received the LE message back to be E state.

Assuming again that there are three switches S1, S2 and S3, wherein S1 is an edge switch that is adjacent to the first network element and S3 is another edge switch that is adjacent to the second network element.

Figure 3A:
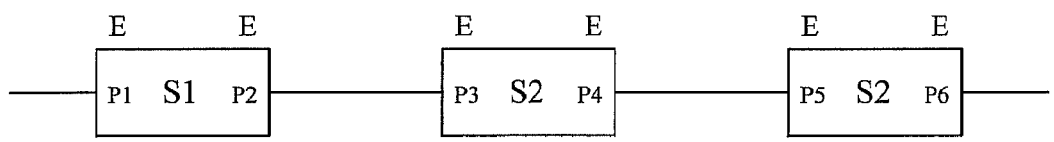
FIG. 3a to FIG. 3g are schematic diagrams of yet another attribute propagation process according to an embodiment of the present invention.

With reference to FIG. 3a, the states of port P1 of S1 on the first network element side, port P2 of S1 on the second network element side, port P3 of S2 on the first network element side, port P4 of S2 on the second network element side, port P5 of S3 on the first network element side and port P6 of S3 on the second network element side are all in E state.

Figure 3B:
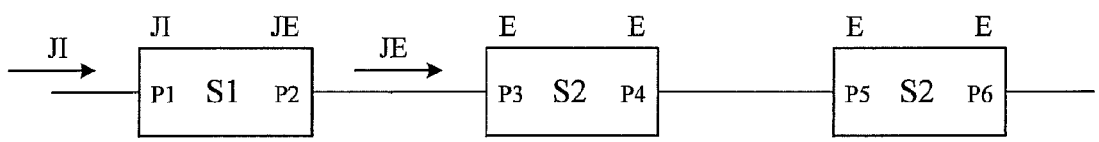
Figure 3C:
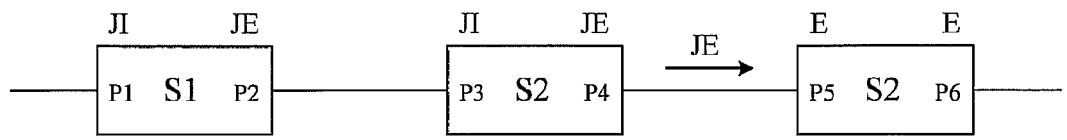
Figure 3D:
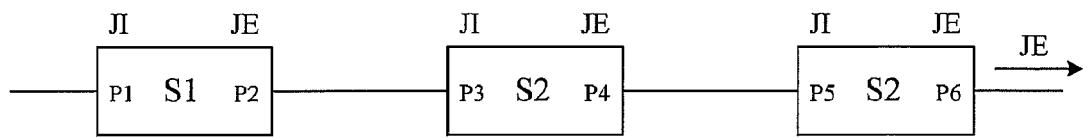
Figure 3E:
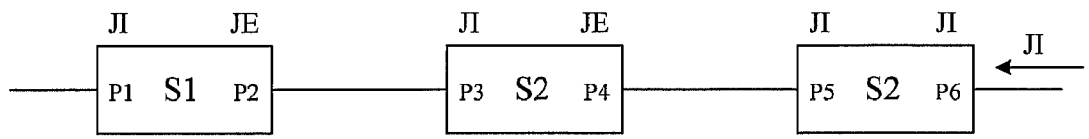
Figure 3F:
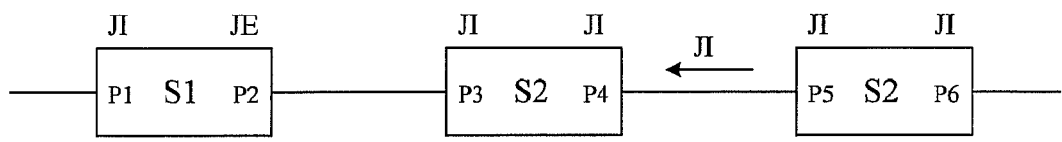

With reference to FIG. 3b, the port P1 of S1 on the first network element side is configured to be JI state according to the JI message sent by the first network element. The port P1 sends a JI message towards the direction of the first network element, which does not perform any processing, and port P2 on the second network element side can be automatically configured to be JE state and send a JE message towards the direction of the second network element.

With reference to FIG. 3c to FIG. 3f, the subsequent processing is similar to FIG. 1c to FIG. 1f.

Figure 3G:
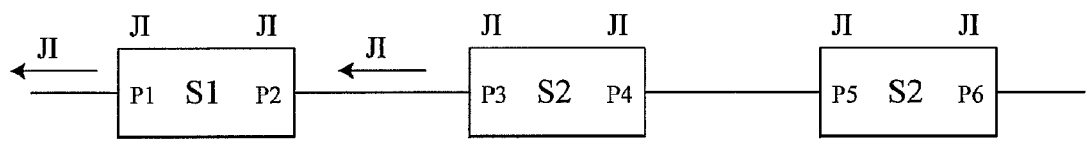

With reference to FIG. 3g, the port P2 of S1 on the second network element side is configured to be JI state according to the JI message transmitted reversely by S2 and the port P1 on the first network element side which is in the JI state can automatically send a JI message towards the direction of the first network element. Because the port of the first network element that receives this JI message has been configured to be JI state, so no more processing will be performed.

After the processing as shown in FIG. 3a to FIG. 3g, the attribute can also be deregistered in a manner similar to FIG. 2a to FIG. 2f. It is just that the deregistration of the attribute can be triggered by an LE message sent by the first network element.

In actual applications, how to trigger and when to trigger the first network element and the second network element to use a JI message to configure an attribute for a port of an edge switch on a corresponding side can be carried out by those skilled in the art in any manner and won't be further described here.

In the following, based on the above described states and various types of messages, the attribute propagation method according to an embodiment is described in detail.

Figure 4:
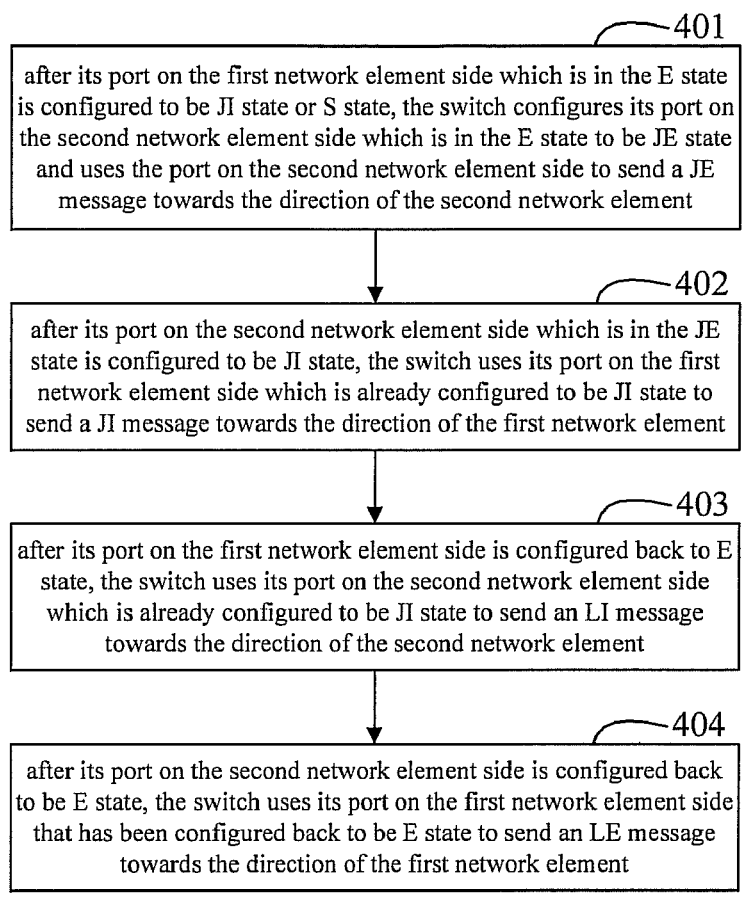
FIG. 4 is an exemplary flow chart of an attribute propagation method according to an embodiment of the present invention.

FIG. 4 illustrates an exemplary flow chart of the attribute propagation method according to an embodiment of the present invention. For each attribute, the attribute propagation method sets the initial state of all the ports of all the switches between the first network element and the second network element to be E state, and as shown in FIG. 4, each switch performs the following steps for each attribute:

step 401, after its port on the first network element side which is in the E state is configured to be JI state or S state, the switch configures its port on the second network element side which is in the E state to be JE state and uses the port on the second network element side to send a JE message towards the direction of the second network element for notifying the opposite end to register this attribute and indicating that the present end has not registered this attribute.

In actual applications, if the edge switch that is adjacent to the first network element carries out this process, then because the port of the first network element has already registered this attribute and configured to be JI state, so before this step this switch can either configure its port on first network element side to be JI state according to the JI message sent from the first network element towards the direction of the second network element, or this switch can also register this attribute directly by manual configuration and configure it to be S state.

However, if this step is carried out by other switches that are not adjacent to the first network element, then because another adjacent switch on the first network element side of this switch can use a port on the second network element side to propagate an attribute to this switch and at this time the ports of all switches on the second network element side are usually in JE state, so before this step, this switch normally configures its port on the first network element side to be JI state according to the JE message sent by its adjacent switch on the first network element side.

Additionally, a special case is that a port on either side of a non-edge switch which is not adjacent to the first network element and not adjacent to the second network element has this attribute registered by manual configuration and is configured to be S state. In this case, this non-edge switch will propagate this attribute towards the direction of the first network element and the direction of the second network element at the same time. Under such circumstances, ports on the second network element side of only part of the switches in the direction of the first network element can have this attribute registered and ports on the first network element side of only part of the switches in the direction of the second network element can have this attribute registered. Therefore, this special case cannot guarantee the normal communication between the first network element and second network element. The present application does not consider such as case.

Step 402, after its port on the second network element side which is in the JE state is configured to be JI state, the switch uses its port on the first network element side which is already configured to be JI state to send a JI message towards the direction of the first network element, for notifying the opposite end to register this attribute and indicating that the present end has registered this attribute.

In actual applications, if an edge switch that is adjacent to the second network element carries out this process, then because the port of the second network element must have registered this attribute and configured to be JI state, so before this step, this switch can configure its port on the second network element side to be JI state according to the JI message transmitted reversely by the second network element towards the direction of the first network element.

Step 403, after its port on the first network element side is configured back to E state, the switch uses its port on the second network element side which is already configured to be JI state to send an LI message towards the direction of the second network element, for notifying the opposite end to deregister this attribute and indicating that the present end has not deregistered this attribute.

In actual applications, if an edge switch that is adjacent to the first network element carries out this process, then because the port of the first network element must have deregistered this attribute and is configured back to be E state, so before this step, this switch can configure its port on the first network element side back to be E state according to the LE message sent from the first network element towards the direction of the second network element, or this switch can also directly deregister this attribute by manual configuration and configure it back to be E state.

However, if this step is carried out by other switches that are not adjacent to the first network element, then because a port on the second network element side of another adjacent switch on the first network element side of this switch remains to be JI state and has not been configured back to be E state yet, so before this step, this switch usually can configure its port on the first network element side back to be E state according to the LI message sent by its adjacent switch on the first network element side.

Step 404, after its port on the second network element side is configured back to be E state, the switch uses its port on the first network element side that has been configured back to be E state to send an LE message towards the direction of the first network element, for notifying the opposite end to deregister this attribute and indicating that the present end has deregistered this attribute.

In actual applications, if this process is carried out by an edge switch adjacent to the second network element, then because the port of the second network element must have deregistered this attribute and is configured back to be E state, so before this step, this switch can configure its port on the second network element side back to be E state according to the LE message transmitted reversely by the second network element towards the direction of the first network element.

The process ends now.

Additionally, it needs to be pointed out that, in step 401 of the above process, a port of a switch on the first network element side is configured to be JI state or S state. For a port on the first network element side which is in the JI state, although this port indicates that a corresponding attribute needs to be propagated, the JI state does not necessarily require that the port in the JI state is used immediately to send a JI message, instead it waits until a port of the switch on the second network element side receives the JI message as shown in the subsequent step 402 and then propagates the attribute.

Moreover, considering that the registered attributes of all switch ports need to be maintained, the port of each switch that has been registered may repetitively send a corresponding registration message at regular intervals. Therefore, the attribute propagation method of the present embodiment needs to provide a port of each switch on the first network element side with a Join timer and a Leave timer, and also provide a port of each switch on the second network element side with another Join timer and another Leave timer.

In this way, when its port on the second network element side sends a JE message or a JI message, each switch triggers the Join timer at its port on the second network element side to start timing, and when the timing of this Join timer expires, uses the port on the second network element side which is in the JE state to resend the JE message or uses the port on the second network element side which has been configured to be JI state to resend the JE message or JI message. Accordingly, when its port on the first network element side receives a JE message or a JI message, each switch clears the Leave timer at its port on the first network element side to restart timing, and if a JE message or JI message is not received again when the timing of this Leave timer expires, which indicates that the link probably has failed, each switch configures its port on the first network element side back to be E state in order to prevent that the configured attribute cannot be deregistered due to link failure.

Similarly, when its port on the first network element side sends a JI message, each switch triggers the Join timer at its port on the first network element side to start timing, and when the timing of this Join timer expires, uses the port on the first network element side which is in the JI state to resend the JI message. Accordingly, when its port on the second network element side receives a JI message, each switch clears the Leave timer at its port on the second network element side to restart timing, and if a JI message is not received again when the timing of this Leave timer expires, which indicates that the link probably has failed, each switch configures its port on the second network element side back to be E state in order to prevent that the configured attribute cannot be deregistered due to link failure.

Furthermore, considering that multiple attributes could be configured on a port of the same switch and need to be propagated or deregistered, in order to reduce the link oscillation caused by sending corresponding messages respectively for each of the attributes among switches, the present embodiment enables each port to send a corresponding message for both attributes to be propagated and attributes to be deregistered at regular intervals. The specific implementation is as follows:

The port on the first network element side and the port on the second network element side of each switch are respectively provided with a corresponding list of attributes to be propagated for recording all attributes to be propagated by a corresponding port and the attributes to be deregistered.

The port on the first network element side and the port on the second network element side of each switch are respectively provided with a corresponding Hold timer, for starting timing when the state of a corresponding port changes, and when the timing expires, triggering the switch to use a corresponding port to send a JI message and/or a JE message and/or an LE message and/or an LI message corresponding to each of the attributes recorded in a corresponding list of attributes to be propagated.

In the following, a switch system that can propagate an attribute according to an embodiment is described in detail based on the above described states and messages.

The switch system that can propagate an attribute according to an embodiment is connected between a first network element and a second network element and comprises a number of switches. For each attribute:

after its port on the first network element side which is in the E state is configured to be JI state or S state, each switch configures its port on the second network element side which is in the E state to be JE state and uses the port on the second network element side which is in the JE state to send a JE message towards the direction of the second network element for notifying the opposite end to register this attribute and indicating that the present end has not registered this attribute.

Hereafter, after its port on the second network element side which is in the JE state is configured to be JI state, each switch uses its port on the first network element side which is already configured to be JI state to propagate a JI message reversely towards the direction of the first network element, for notifying the opposite end to register this attribute and indicating that the present end has registered this attribute.

In actual applications, all the switches comprise an edge switch that is adjacent to the first network element and the attribute propagation process is usually initiated from this edge switch. In this case, for a switch which is adjacent to the first network element, it can either configure its port on the first network element side which is in the E state to be JI state according to the JI message sent from the first network element towards the direction of the second network element or it can also configure its port on the first network element side to be S state by manual configuration. On the contrary, for a switch that is not adjacent to the first network element, it can further configure its port on the first network element side which is in the E state to be JI state according to the JE message sent by a port on the second network element side of its adjacent switch on the first network element side towards the direction of the second network element.

It is apparent that among all the switches there must be a switch that is adjacent to the second network element. Then, for a switch which is adjacent to the second network element, it can configure its port on the second network element side which is in the JE state to be JI state according to the JI message propagated reversely from the second network element towards the direction of the first network element. On the contrary, for a switch that is not adjacent to the second network element, it can further configure its port on the second network element side which is in the JE state to be JI state according to the JI message sent by its adjacent switch on the second network element side towards the direction of the first network element.

Similar to the attribute propagation method according to the present embodiment, in order to deregister an attribute that is already registered on a port:

after its port on the first network element side is configured back to be E state, each switch further can use its port on the second network element side which is still in the JI state to send an LI message towards the direction of the second network element, for notifying the opposite end to deregister this attribute and indicating that the present end has not deregistered this attribute;

accordingly, after its port on the second network element side is configured back to be E state, each switch further uses its port on the first network element side that has been configured back to be E state to send an LE message towards the direction of the first network element, for notifying the opposite end to deregister this attribute and indicating that the present end has deregistered this attribute.

In actual applications, for the above mentioned edge switch that is adjacent to the first network element, it can configure its port on the first network element side back to be E state according to the LE message sent from the first network element towards the direction of the second network element, or by manual configuration. On the contrary, for a switch that is not adjacent to the first network element, it can configure its port on the first network element side back to be E state according to the LI message sent by a port on the second network element side of its adjacent switch on the first network element side towards the direction of the second network element.

Similarly, for the above mentioned edge switch which is adjacent to the second network element, it can configure its port on the second network element side back to be E state according to the LE message transmitted reversely by the second network element towards the direction of the first network element. On the contrary, for a switch that is not adjacent to the second network element, it can configure its port on the second network element side back to be E state according to the LE message sent by a port on the first network element side of its adjacent switch on the second network element side towards the direction of the first network element.

Moreover, considering that the registered attributes of all switch ports need to be maintained, the port of each switch that has been registered may repetitively send a corresponding registration message at regular intervals. In this case:

a port on the first network element side of each switch is provided with a Join timer and a Leave timer, and a port on the second network element side of each switch is also provided with another Join timer and another Leave timer, wherein the Join timer at the port on the first network element side is used for starting timing each time when the port on the second network element side of the switch to which it belongs sends a JE message or a JI message, and triggering the switch to which it belongs to re-send the JE message or the JI message by means of the port on the second network element side when the timing expires;

the Leave timer at the port on the first network element side is used for clearing and restarting timing each time when the port on the first network element side of the switch to which it belongs receives a JE message or a JI message, and triggering the switch to which it belongs to configure the port on the first network element side back to be E state when the timing expires;

the Join timer at the port on the second network element side is used for starting timing when the port on the first network element side of the switch to which it belongs sends a JI message, and triggering the switch to which it belongs to re-send the JI message by means of the port on the first network element side when the timing expires;

the Leave timer at the port on the second network element side is used for clearing and restarting timing when the port on the second network element side of the switch to which it belongs receives a JI message, and triggering the switch to which it belongs to configure the port on the second network element side back to be E state when the timing expires.

Furthermore, considering that multiple attributes could be configured on a port of the same switch and need to be propagated or deregistered, in order to reduce the link oscillation caused by sending corresponding messages respectively for each of the attributes among switches:

the port of each switch on the first network element side is further provided with a first list of attributes to be propagated for recording all attributes to be propagated by the port on the first network element side and the attributes to be deregistered;

the port of each switch on the first network element side is further provided with a Hold timer, for starting timing when the state of the port on the first network element side changes, and when the timing expires, triggering the switch to use the port on the first network element side to send a JI message and/or a JE message and/or an LE message and/or an LI message corresponding to each of the attributes recorded in the first list of attributes to be propagated;

the port of each switch on the second network element side is further provided with a second list of attributes to be propagated for recording all attributes to be propagated by the port on the second network element side and the attributes to be deregistered;

the port of each switch on the second network element side is further provided with another Hold timer, for starting timing when the state of the port on the second network element side changes, and when the timing expires, triggering the switch to use the port on the second network element side to send a JI message and/or a JE message and/or an LE message and/or an LI message corresponding to each of the attributes recorded in the second list of attributes to be propagated.

The attribute propagation method and switch system according to an embodiment have been described in detail. The attribute propagation method and switch system according to an embodiment can enable propagation of universal attributes, such as the VSAN attribute indicating the VSAN a port should join in or the Zone attribute indicating the Zone a port should join in.

In order to enable the attribute propagation method and the switch system according to the embodiment to more easily propagate an attribute and be compatible with an FC network, the present embodiment modifies the Switch Fabric Internal Link Service (SW_ILS) protocol message in the existing FC network and uses the modified SW_ILS protocol message to implement the above described JI message, JE message, LI message and LE message.

In order to enable an FC network to still identify the JI message, JE message, LI message and LE message in the SW_ILS, the present embodiment does not modify the header of the messages.

However, the message load field of the SW_ILS protocol can be modified as follows:

the SW_ILS protocol command in the 0th~3th bytes of the message load field is set to be a value representing attribute propagation, such as 0x70000000;

starting from the 4th byte of the message load field, it can carry:

the attribute type (AttriType), for instance, 01 can indicate the VSAN attribute of the VSAN that should be joined and 02 can indicate the Zone attribute of the Zone that should be joined;

the number of bytes occupied by each type of attribute (AttribLen);

the number of each type of attribute (AttribNum), and the attribute item of each type (Attrib), such as VSAN attribute items 1-5 of the VSAN attribute type.

Wherein, each attribute item further includes the event type (Event) corresponding to said attribute item as well as the attribute value (AttribValue), and the value of the Event is used for identifying a JI message, a JE message, an LI message or an LE message. AttribValue refers to specific information of an attribute. For example, AttribValue of the VSAN attribute item can mean that it needs to join VSAN1, to join VSAN2 or to join VSAN 5, etc.

The above description is intended to illustrate some preferred embodiments of the present invention and not to limit the protection scope of the present invention. All those modifications, equivalents and improvements falling within the spirit and principle of the present invention are intended to be encompassed in the protection scope of the present invention.

What is claimed is:

1. A method based on a fiber channel (FC) network for propagating an attribute across interconnecting switches between a first network element and a second network element, wherein the switches have ports that have initial states set to be an empty state, wherein in the empty state, the attribute has not been registered and does not need to be propagated, said method comprising:

after a first port of a first switch on the first network element side that is in the empty state is to be in a first state, wherein the first state indicates that said attribute has been registered and needs to be propagated, the first switch configuring a second port of the first switch on the second network element side that is in an empty state to be in a second state, wherein the second state indicates that said attribute has not been registered but needs to be propagated, and sending, through the second port of the first switch, towards the direction of the second network element, a first registration message that informs a first port of a second switch to register said attribute and indicates that the second port of the first switch has not registered said attribute; and after a second port of the second switch on the second network element side that is in the second state is to be in the first state, the second switch sending, through the first port of the second switch that has been configured into the first state, towards the direction of the first network element, a second registration message that informs the second port of the first switch to register said attribute and indicates that the first port of the second switch has registered said attribute.

2. The method according to claim 1, wherein, when the first switch is adjacent to the first network element, configuring the first port of the first switch that is in the empty state into the first state according to the second registration message sent from the first network element towards the direction of the second network element or by manual configuration;

when the first switch is not adjacent to the first network element, configuring the first port of the first switch that is in the empty state into the first state according to the first registration message sent from a third switch that is adjacent to the first switch on the first network element side towards the direction of the second network element;

when the second switch is adjacent to the second network element, configuring the second port of the second switch that is in the second state into the first state according to the second registration message sent from the second network element towards the direction of the first network element; and when the second switch is not adjacent to the second network element, configuring the second port of the second switch that is in the second state into the first state according to the second registration message sent from a fourth switch that is adjacent to the second switch on the second network element side towards the direction of the first network element.

3. The method according to claim 2, further comprising:

after the first port of the first switch is configured back to the empty state, the first switch sending, through the second port of the first switch, towards the direction of the second network element, a first deregistration message that informs the first port of the second switch to deregister said attribute and indicates that the second port of the first switch has not deregistered said attribute;

after the second port of the second switch is configured back to the empty state, the second switch sending, through the first port of the second switch that has been configured back to the empty state, towards the direction of the first network element, a second deregistration message that informs the second port of the first switch to deregister said attribute and indicates that the first port of the second switch has deregistered said attribute.

4. The method according to claim 3, wherein, when the first switch is adjacent to the first network element, configuring the first port of the first switch back into the empty state according to the first deregistration message sent from the first network element towards the direction of the second network element or by manual configuration;

when the first switch is not adjacent to the first network element, configuring the first port of the first switch back into the empty state according to the first deregistration message sent from the third switch that is adjacent to the first switch on the first network element side towards the direction of the second network element;

when the second switch is adjacent to the second network element, configuring the second port of the second switch back into the empty state according to the second deregistration message sent from the second network element towards the direction of the first network element; and when the second switch is not adjacent to the second network element, configuring the second port of the second switch back into the empty state according to the second deregistration message sent from the fourth switch that is adjacent to the second switch on the second network element side towards the direction of the first network element.

5. The method according to claim 4, wherein, the first port of the first switch on the first network element side includes a first Join timer and a first Leave timer, and the second port of the first switch on the second network element side is provided with a second Join timer and a second Leave timer;

triggering the second Join timer to start timing each time that the second port of the first switch sends the first registration message or the second registration message and re-sending the first registration message or the second registration message through the second port of the first switch when the timing of the second Join timer expires;

clearing the first Leave timer to restart timing each time that the first port of the first switch receives the first registration message or the second registration message and configuring the first port of the first switch back to the empty state when the timing of the first Leave timer expires;

triggering the first Join timer to start timing each time that the first port of the first switch sends the second registration message and re-sending the second registration message through the first port of the first switch when the timing of the first Join timer expires; and clearing the second Leave timer to restart timing each time that the second port of the first switch receives the second registration message and configuring the second port of the first switch back to the empty state when the timing of the second Leave timer expires.

6. The method according to claim 5, wherein, the first port of the first switch includes a first list of attributes to be propagated to record attributes to be propagated by the first port of the first switch and the attributes to be deregistered;

the first port of the first switch also includes a first Hold timer to start timing when the state of the first port of the first switch changes, and to trigger the first switch to send, through the first port of the first switch, at least one of the second registration message and the second deregistration message corresponding to each of the attributes recorded in the first list of attributes to be propagated when the timing of the first Hold timer expires;

the second port of the first switch includes a second list of attributes to be propagated to record attributes to be propagated by the second port of the first switch and the attributes to be deregistered; and the second port of the first switch includes a second Hold timer to start timing when the state of the second port of the first switch changes, and to trigger the first switch to send, through the second port of the first switch, at least one of the first registration message, the second registration message, the first deregistration message, and the second deregistration message corresponding to each of the attributes recorded in the second list of attributes to be propagated when the timing of the second Hold timer expires.

7. The method according to claim 3, wherein the first registration message, the second registration message, the first deregistration message, and the second deregistration message are all messages of the Switch Fiber Interactive Link Service SW_ILS protocol, in a message load field of said SW_ILS protocol messages, setting the SW_ILS protocol commands in the 0~3rd bytes to be a value representing attribute propagation, and starting from the 4th byte of the message load field, carrying the attribute type, the number of bytes occupied by each type of attributes, the number of each type of attributes, and the attribute item of each type;

wherein each attribute item includes an event type corresponding to said attribute item as well as the value representing attribute propagation, and using the value of the event type to identify the first registration message or the second registration message, or the first deregistration message or the second deregistration message.

8. The method according to claim 1, wherein said attribute is the Virtual Storage Area Network VSAN or ZONE to which the ports join.

9. A switch system based on a fiber channel (FC) network, wherein said switch system is connected between a first network element and a second network element, and comprises a plurality of switches, wherein for each attribute:

after a first port of a first switch on the first network element side that is in an empty state is to be in a first state, wherein the empty state indicates that said attribute has not been registered and does not need to be propagated and the first state indicates that said attribute has been registered and needs to be propagated, the first switch is to configure a second port of the first switch on the second network element side that is in the empty state to be in a second state, wherein the second state indicates that said attribute has not been registered but needs to be propagated, and to send, through the second port of the first switch, towards the direction of the second network element, a first registration message that informs a first port of a second switch to register said attribute and indicates that the present end has not registered said attribute; and after a second port of the second switch on the second network element side that is in the second state is to be in the first state, the second switch is to send, through the first port of the second switch that has been configured into the first state, towards the direction of the first network element, a second registration message that informs the second port of the first switch to register said attribute and indicates that the first port of the second switch has registered said attribute.

10. The system according to claim 9, wherein, when the first switch is adjacent to the first network element, the first port of the first switch that is in the empty state is to be configured into the first state according to the second registration message sent from the first network element towards the direction of the second network element or by manual configuration;

when the first switch is not adjacent to the first network element, the first port of the first switch that is in the empty state is to be configured into the first state according to the first registration message sent from a third switch that is adjacent to the first switch on the first network element side towards the direction of the second network element;

when the second switch is adjacent to the second network element, the second port of the second switch that is in the second state is to be configured into the first state according to the second registration message sent from the second network element towards the direction of the first network element; and when the second switch is not adjacent to the second network element, the second port of the second switch that is in the second state is to be configured into the first state according to the second registration message sent from a fourth switch that is adjacent to the second switch on the second network element side towards the direction of the first network element.

11. The system according to claim 10, wherein, after the first port of the first switch is configured back to the empty state, the first switch is to further send, through the second port of the first switch, towards the direction of the second network element, a first deregistration message that informs the first port of the second switch to deregister said attribute and indicates that the second port of the first switch has not deregistered said attribute; and after the second port of the second switch is configured back to the empty state, the second switch is further to send, through the first port of the second switch that has been configured back to the empty state, towards the direction of the first network element, a second deregistration message that informs the second port of the first switch to deregister said attribute and indicates that the first port of the second switch has deregistered said attribute.

12. The system according to claim 10, wherein, when the first switch is adjacent to the first network element, the first switch is to configure the first port of the first switch back into the empty state according to the sec-first deregistration message sent from the first network element towards the direction of the second network element or by manual configuration;

when the first switch is not adjacent to the first network element, the first switch is to configure the first port of the first switch back into the empty state according to the first deregistration message sent from the third switch that is adjacent to the first switch on the first network element side towards the direction of the second network element;

when the second switch is adjacent to the second network element, the second switch is to configure the second port of the second switch back into the empty state according to the second deregistration message sent from the second network element towards the direction of the first network element; and when the second switch is not adjacent to the second network element, the second switch is to configure the second port of the second switch back into the empty state according to the second deregistration message sent from the fourth switch that is adjacent to the second switch on the second network element side towards the direction of the first network element.

13. The system according to claim 12, wherein the first port of the first switch includes a first Join timer and a first Leave timer, and the second port of the first switch includes a second Join timer and a second Leave timer, wherein, the second Join timer is to be used to start timing each time that the second port of the first switch sends the first registration message or the second registration message, and to trigger the first switch to re-send the first registration message or the second registration message through the second port of the first switch when the timing of the second Join timer expires;

the first Leave timer is to be used to clear and restart timing each time that the first port of the first switch receives the first registration message or the second registration message, and to trigger the first switch to configure the first port of the first switch back to the empty state when the timing of the first Leave timer expires;

the first Join timer is to be used to start timing each time that the first port of the first switch sends the second registration message, and to trigger the first switch to re-send the second registration message through the first port of the first switch when the timing of the first Join timer expires; and the second Leave timer is to be used to clear and restart timing each time that the second port of the first switch receives the first registration message, and to trigger the first switch to configure the second port of the first switch back to the empty state when the timing of the second Leave timer expires.

14. The system according to claim 13, wherein, the first port of the first switch includes a first list of attributes to be propagated to record attributes to be propagated by the first port of the first switch and the attributes to be deregistered;

the first port of the first switch also includes a first Hold timer to start timing when the state of the first port of the first switch changes, and to trigger the first switch to send, through the first port of the first switch, at least one of the second registration message and the second deregistration message corresponding to each of the attributes recorded in the first list of attributes to be propagated when the timing of the first Hold timer expires;

the second port of the first switch includes a second list of attributes to be propagated to record attributes to be propagated by the second port of the first switch and the attributes to be deregistered; and the second port of the first switch includes a second Hold timer to start timing when the state of the second port of the first switch changes, and to trigger the switch to send, through the second port of the first switch, at least one of the first registration message, the second registration message, the first deregistration message, and the second deregistration message corresponding to each of the attributes recorded in the second list of attributes to be propagated when the timing of the second Hold timer expires.

15. The system according to claim 11, wherein the first registration message, the second registration message, the first deregistration message, and the second deregistration message are all messages of the Switch Fiber Interactive Link Service SW_ILS protocol, in a message load field of said SW_ILS protocol messages, the SW_ILS protocol commands in the 0~3rd bytes are set to be a value representing attribute propagation, and starting from the 4th byte of the message load field, the attribute type, the number of bytes occupied by each type of attributes, the number of each type of attributes, and the attribute item of each type are carried; and wherein each attribute item includes an event type corresponding to said attribute item as well as the value representing attribute propagation, and the value of the event type is used to identify the first registration message or the second registration message, or the first deregistration message or the second deregistration message.

16. The system according to claim 9, wherein said attribute is the Virtual Storage Area Network VSAN or ZONE to which the ports join.

* * * * *

UNITED STATES PATENT AND TRADEMARK OFFICE
CERTIFICATE OF CORRECTION

| | | |
|---|---|---|
| PATENT NO. | : 8,792,386 B2 | Page 1 of 1 |
| APPLICATION NO. | : 13/387336 | |
| DATED | : July 29, 2014 | |
| INVENTOR(S) | : Yingjun Guo et al. | |

It is certified that error appears in the above-identified patent and that said Letters Patent is hereby corrected as shown below:

In the Claims

In column 21, line 27, in Claim 12, delete "sec-first" and insert -- first --, therefor.

Signed and Sealed this
Sixteenth Day of December, 2014

Michelle K. Lee
*Deputy Director of the United States Patent and Trademark Office*